(12) United States Patent
Yabashi

(10) Patent No.: US 11,738,702 B2
(45) Date of Patent: Aug. 29, 2023

(54) WATERPROOF UNIT AND WIRE HARNESS

(71) Applicant: SUMITOMO WIRING SYSTEMS, LTD., Yokkaichi (JP)

(72) Inventor: Tomohiro Yabashi, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/909,193

(22) PCT Filed: Feb. 24, 2021

(86) PCT No.: PCT/JP2021/006891
§ 371 (c)(1),
(2) Date: Sep. 2, 2022

(87) PCT Pub. No.: WO2021/182104
PCT Pub. Date: Sep. 16, 2021

(65) Prior Publication Data
US 2023/0087121 A1      Mar. 23, 2023

(30) Foreign Application Priority Data

Mar. 10, 2020   (JP) ................................ 2020-041098

(51) Int. Cl.
*B60R 16/02*       (2006.01)
*H02G 3/04*        (2006.01)
(Continued)

(52) U.S. Cl.
CPC ...... *B60R 16/0222* (2013.01); *B60R 16/0215* (2013.01); *H01B 7/0045* (2013.01);
(Continued)

(58) Field of Classification Search
CPC ... B60R 6/0207; B60R 6/0215; B60R 6/0222; H02G 3/0406; H02G 3/0468; H02G 3/06;
(Continued)

(56) References Cited

U.S. PATENT DOCUMENTS

| 2015/0008032 A1* | 1/2015 | Nakai ................. B60R 16/0222 |
| | | 174/650 |
| 2018/0265018 A1* | 9/2018 | Yabashi .................... F16L 5/10 |

(Continued)

FOREIGN PATENT DOCUMENTS

| JP | 2001-008335 A | 1/2001 |
| JP | 2002-186133 A | 6/2002 |

(Continued)

OTHER PUBLICATIONS

May 18, 2021 Search Report issued in International Patent Application No. PCT/JP2021/006891.

*Primary Examiner* — Paresh Paghadal
(74) *Attorney, Agent, or Firm* — Oliff PLC

(57) ABSTRACT

A waterproof unit including: a first waterproof tube that has a tubular shape and is to be attached to a through hole of a vehicle body panel disposed between a waterproof area that requires waterproofing and a non-waterproof area that does not require waterproofing; a second waterproof tube that has a tubular shape and is to be disposed in the non-waterproof area so as to be spaced apart from the first waterproof tube; and a first exterior tube that has a tubular shape, is disposed between the first waterproof tube and the second waterproof tube, and is coupled to the first waterproof tube and the second waterproof tube, wherein the first exterior tube has higher flexural rigidity than the first waterproof tube to be kept from coming into contact with the first waterproof tube when the waterproof unit is bent in the non-waterproof area.

11 Claims, 6 Drawing Sheets

(51) Int. Cl.
*H01B 7/00* (2006.01)
*H01B 17/58* (2006.01)

(52) U.S. Cl.
CPC ......... *H01B 17/583* (2013.01); *H02G 3/0406* (2013.01); *H02G 3/0468* (2013.01)

(58) Field of Classification Search
CPC ......... H02G 3/0691; H02G 3/022; F16L 5/02; H01B 7/0045
See application file for complete search history.

(56) References Cited

U.S. PATENT DOCUMENTS

2018/0312119 A1* 11/2018 Ujita .................... H01B 7/0045
2019/0244730 A1    8/2019 Kushima et al.

FOREIGN PATENT DOCUMENTS

| JP | 2015-042023 A | 3/2015 |
|---|---|---|
| JP | 2016-005382 A | 1/2016 |
| JP | 2017-079505 A | 4/2017 |
| JP | 2017-216836 A | 12/2017 |
| JP | 2018-113739 A | 7/2018 |
| JP | 2018-153059 A | 9/2018 |

* cited by examiner

WATERPROOF UNIT AND WIRE HARNESS

BACKGROUND

The present disclosure relates to a waterproof unit and a wire harness.

There is a conventional grommet that is attached to a through hole formed in a vehicle body panel separating the inside and the outside of a cabin and protects electrical wires passed through the through hole (see JP 2015-42023A, for example). Such a grommet has a structure in which an attachment portion that is attached to the through hole and a tube portion through which the electrical wires are passed are formed as a single piece. The attachment portion includes a flange portion that has a larger external shape than the tube portion and a groove portion that is formed in the outer circumferential surface of the flange portion and fitted to the through hole. The grommet is made of an elastic material such as rubber and is configured to be capable of preventing water from entering via the space between the through hole of the vehicle body panel and the electrical wires.

SUMMARY

In the grommet described above, if the tube portion is sharply bent in the vicinity of the attachment portion, the bent tube portion may come into contact with the attachment portion. If the tube portion and the attachment portion are damaged by coming into contact with each other, there arises a problem of degradation in the waterproof performance of the grommet.

An exemplary aspect of the disclosure provides a waterproof unit and a wire harness with which degradation in the waterproof performance can be suppressed.

A waterproof unit according to the present disclosure includes: a first waterproof tube that has a tubular shape and is to be attached to a through hole of a vehicle body panel disposed between a waterproof area that requires waterproofing and a non-waterproof area that does not does not require waterproofing; a second waterproof tube that has a tubular shape and is to be disposed in the non-waterproof area so as to be spaced apart from the first waterproof tube; and a first exterior tube that has a tubular shape, is disposed between the first waterproof tube and the second waterproof tube, and is coupled to the first waterproof tube and the second waterproof tube, wherein the first exterior tube has higher flexural rigidity than the first waterproof tube.

A wire harness according to the present disclosure includes the waterproof unit and an electrical wire passed through the waterproof unit.

The waterproof unit and the wire harness according to the present disclosure achieve the effect of suppressing degradation in the waterproof performance.

DETAILED DESCRIPTION OF EMBODIMENTS

Figure 1:
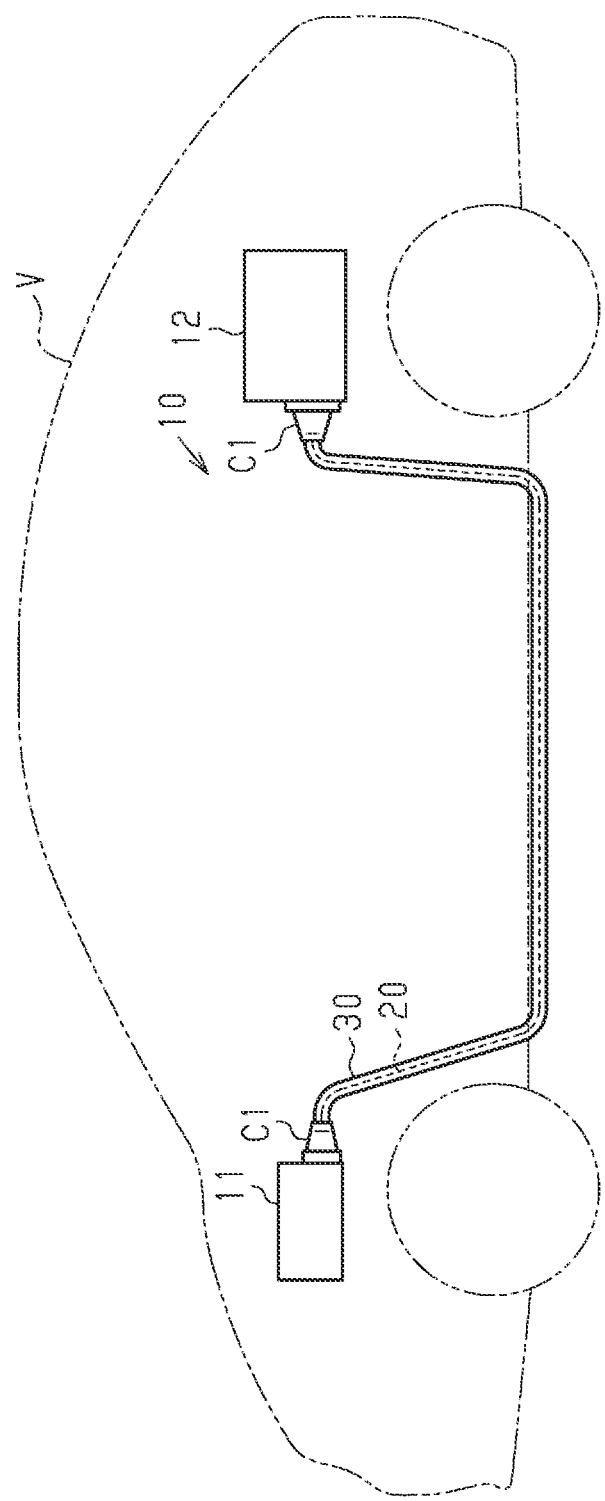
FIG. 1 is a schematic configuration diagram showing a wire harness according to an embodiment.

Description of Embodiments of the Present Disclosure

First, embodiments of the present disclosure will be listed and described.

[1] A waterproof unit according to the present disclosure includes: a first waterproof member that has a tubular shape and is to be attached to a through hole of a vehicle body panel disposed between a waterproof area that requires waterproofing and a non-waterproof area that does not require waterproofing; a second waterproof member that has a tubular shape and is to be disposed in the non-waterproof area so as to be spaced apart from the first waterproof member; and a first exterior member that has a tubular shape, is disposed between the first waterproof member and the second waterproof member, and is coupled to the first waterproof member and the second waterproof member, wherein the first exterior member has higher flexural rigidity than the first waterproof member.

According to this configuration, the first exterior member that has higher flexural rigidity than the first waterproof member is provided between the first waterproof member and the second waterproof member. Therefore, the first exterior member can be kept from being sharply bent. For example, the first exterior member can be kept from being brought into a sharply bent state. Accordingly, the first exterior member can be kept from coming into contact with the first waterproof member as a result of being bent. Consequently, it is possible to suppress damage to the first exterior member and the first waterproof member due to contact therebetween, and thus degradation of the waterproof performance of the waterproof unit can be suppressed.

Here, in the present description, the "sharply bent state" refers to a state in which the first exterior member is bent so as to form an angle of 90° or less. Note that the angle formed by the bent first exterior member is not limited to 90° and may be an angle that can be taken as substantially 90°, so long as the angle is less than 91°.

[2] It is preferable that the waterproof unit further includes a coupling member that couples the first waterproof member and the first exterior member to each other, wherein the first waterproof member includes an attachment portion to be attached to the through hole, a first tube portion to be disposed in the non-waterproof area, and a second tube portion to be disposed in the waterproof area, the first exterior member is only fitted to the first tube portion in the first waterproof member, and the coupling member couples the first tube portion and the first exterior member to each other.

According to this configuration, the first waterproof member and the first exterior member are coupled to each other in the non-waterproof area. Therefore, when compared with a case where the first waterproof member and the first exterior member are coupled to each other in the waterproof area, it is possible to increase the freedom in choosing the material or the like of the coupling member for coupling the first waterproof member and the first exterior member.

[3] It is preferable that the coupling member is a tape member that covers an outer circumferential surface of the first tube portion and an outer circumferential surface of the first exterior member. According to this configuration, the first tube portion of the first waterproof member and the first exterior member can be coupled to each other using the tape member. Therefore, it is possible to easily couple the first tube portion and the first exterior member. Also, since the tape member is disposed in the non-waterproof area, the tape member can be kept from coming into contact with a liquid such as rain water. Therefore, degradation of the adhesiveness of the tape member due to contact with a liquid can be favorably suppressed, and the first tube portion and the first exterior member can be favorably kept coupled to each other by the tape member.

[4] It is preferable that the first exterior member is a corrugated tube that has a bellows structure in which ring-shaped protrusions and ring-shaped recesses are provided continuously and alternately in an axial direction of the first exterior member, the first tube portion is fitted to an outer surface of the first exterior member, and an inner circumferential surface of the first tube portion is provided with a lip that fits in one of the ring-shaped recesses of the first exterior member.

According to this configuration, the lip is formed on the inner circumferential surface of the first tube portion and is fitted to one of the ring-shaped recesses of the first exterior member, which is a corrugated tube. Accordingly, the lip of the first tube portion can be locked to the ring-shaped protrusions, and thus the first exterior member can be kept from moving in the axial direction of the first tube portion. Consequently, it is possible to suppress displacement of the first exterior member in the axial direction of the first tube portion.

[5] It is preferable that a first end portion in an axial direction of the second waterproof member is fitted to the outer surface of the first exterior member, and an inner circumferential surface of the first end portion of the second waterproof member is provided with a lip that fits in one of the ring-shaped recesses of the first exterior member.

According to this configuration, the lip is formed on the inner circumferential surface of the first end portion of the second waterproof member and is fitted to one of the ring-shaped recesses of the first exterior member, which is a corrugated tube. Accordingly, in the first end portion in the axial direction of the second waterproof member, the lip of the second waterproof member can be locked to the ring-shaped protrusions, and thus the first exterior member can be kept from moving in the axial direction of the second waterproof member. Consequently, it is possible to suppress displacement of the first exterior member in the axial direction of the second waterproof member.

[6] It is preferable that the waterproof unit further includes a second exterior member that has a tubular shape and is provided separately from the first exterior member, wherein the second exterior member is coupled to the second tube portion.

According to this configuration, the first exterior member and the second exterior member are individually coupled to the first waterproof member. Accordingly, the lengths by which the first exterior member and the second exterior member are inserted into the first waterproof member can be reduced when compared with a case where the first exterior member and the second exterior member are formed as a single piece. Therefore, it is possible to facilitate insertion of the first exterior member into the first waterproof member and insertion of the second exterior member into the first waterproof member.

[7] It is preferable that the first exterior member extends through the first waterproof member. According to this configuration, the first exterior member that extends from the first waterproof member to the second waterproof member in the non-waterproof area is formed so as to extend through the first waterproof member. Accordingly, the first exterior member extends outward from the first waterproof member in the waterproof area. Thus, exterior members that extend from two sides of the first waterproof member can be constituted by the single first exterior member. Therefore, the number of components can be reduced when compared with a case where separate exterior members extend from the two sides of the first waterproof member.

[8] It is preferable to include the waterproof unit according to any one of [1] to [7] and an electrical wire passed through the waterproof unit.

According to this configuration, the first exterior member that has higher flexural rigidity than the first waterproof member is provided between the first waterproof member and the second waterproof member. Therefore, the first exterior member can be kept from being sharply bent. That is, the first exterior member can be kept from being brought into the sharply bent state. Accordingly, the first exterior member can be kept from coming into contact with the first waterproof member as a result of being bent. Therefore, it is possible to suppress damage to the first exterior member and the first waterproof member and degradation of the waterproof performance of the waterproof unit. Consequently, it is possible to suppress degradation of the waterproof performance of the wire harness.

Details of Embodiments of the Present Disclosure

The following describes specific examples of a waterproof unit and a wire harness according to the present disclosure with reference to the drawings. In the drawings, configurations may be partially exaggerated or simplified for the sake of convenience of description. Also, dimensional ratios of components may differ between the drawings. "Parallel" and "orthogonal" as used in the present description are not necessarily strictly parallel or orthogonal, and may be substantially parallel and orthogonal within the range in which functions and effects of the present embodiment can be achieved. Note that the present disclosure is not limited to the following examples, but is defined by the claims, and is intended to encompass all modifications within the meanings and scope that are equivalent to the claims.

Overall Configuration of Wire Harness 10

A wire harness 10 shown in FIG. 1 electrically connects two or three or more electrical devices (devices) to each other. The wire harness 10 electrically connects, for example, an inverter 11 that is provided in a front portion of a vehicle V such as a hybrid vehicle or an electric vehicle, and a high-voltage battery 12 that is provided rearward of the inverter 11 in the vehicle V, to each other. The wire harness 10 is routed so as to pass under the floor or the like of the vehicle V, for example. For example, the wire harness 10 is routed such that an intermediate portion in the lengthwise direction thereof passes through a space outside the cabin such as a space under the floor of the vehicle V. The inverter 11 is connected to a motor (not shown) for driving wheels, the motor serving as a motive power source for vehicle travel. The inverter 11 generates AC power from DC power from the high-voltage battery 12, and supplies the AC power to the motor. The high-voltage battery 12 is a battery that can supply a voltage of several hundred volts, for example.

The wire harness 10 includes one or a plurality of (two in this example) electrical wires 20, a pair of connectors C1 that are respectively attached to the two ends of the electrical wires 20, and an exterior member 30 that collectively encloses the plurality of electrical wires 20.

Configuration of Electrical Wire 20

One end portion of each electrical wire 20 is connected to the inverter 11 via a connector C1, and the other end portion of each electrical wire 20 is connected to the high-voltage battery 12 via a connector C1. Each electrical wire 20 is formed so as to have an elongated shape extending in the front-rear direction of the vehicle, for example. Each electrical wire 20 is formed so as to be able to be bent into a two-dimensional or three-dimensional shape corresponding to the routing path of the wire harness 10, for example. Each electrical wire 20 is a high-voltage electrical wire that can handle high voltages and large currents, for example. Each electrical wire 20 may be a non-shielded electrical wire that does not have an electromagnetic shielding structure, or a shielded electrical wire that has an electromagnetic shielding structure, for example.

Figure 2:
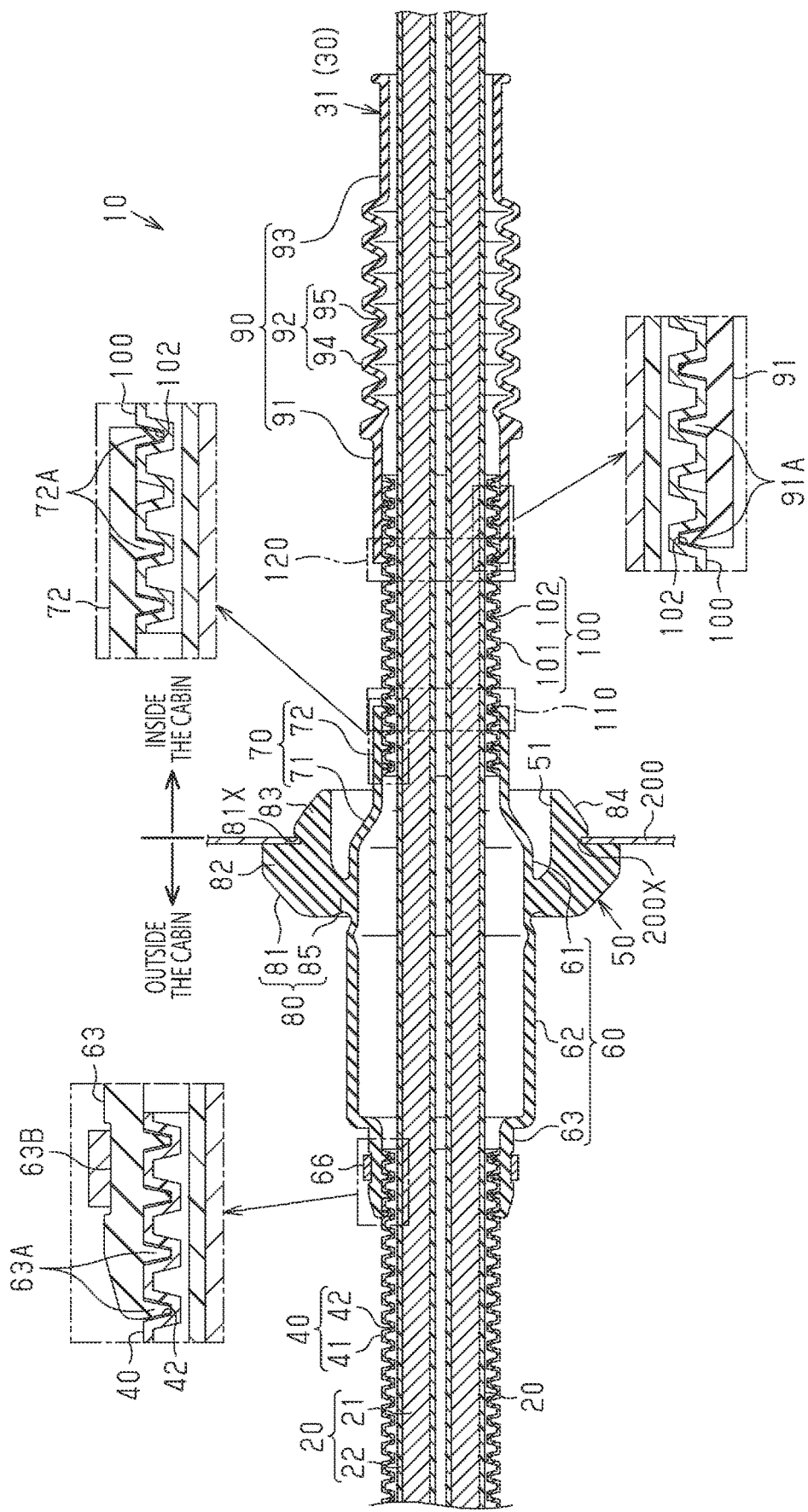
FIG. 2 is a schematic cross-sectional view showing the wire harness according to an embodiment.

As shown in FIG. 2, each electrical wire 20 is a coated electrical wire that includes a core wire 21 that is formed of a conductor, and an insulation coating 22 that covers the outer circumferential surface of the core wire 21.

Configuration of Core Wire 21

For example, a twisted wire formed by twisting a plurality of metal strands together, a columnar conductor that is formed of a single columnar metal rod with a solid core structure, a tubular conductor (a pipe conductor) with a hollow core structure, or the like may be used as the core wire 21. Examples of the columnar conductor include a single core wire and a bus bar. Also, any combination of a stranded wire, a columnar conductor, and a tubular conductor may be used as the core wire 21. The core wire 21 may be made of a metal material such as a copper-based material or an aluminum-based material, for example.

The shape of a cross-section of the core wire 21 taken along a plane orthogonal to the lengthwise direction (axial direction) of the core wire 21 (i.e., the shape of a transverse section) may be any shape. The shape of a transverse section of the core wire 21 may be, for example, a circular shape, a semi-circular shape, a polygonal shape, a square shape, or a flat shape.

Configuration of Insulation Coating 22

The insulation coating 22 covers the outer circumferential surface of the core wire 21 over its entire circumference, for example. The insulation coating 22 is made of an insulating material such as a synthetic resin, for example. The insulation coating 22 may be made of a synthetic resin that contains a polyolefin-based resin such as crosslinked polyethylene or crosslinked polypropylene as a main component, for example. As the material of the insulation coating 22, a single material may be used alone or two or more materials may be used in combination as appropriate. The insulation coating 22 can be formed by subjecting the core wire 21 to extrusion molding (extrusion coating), for example.

Configuration of Exterior Member 30

The exterior member 30 shown in FIG. 1 has an elongated tubular shape overall. A plurality of electrical wires 20 are housed in the internal space of the exterior member 30. The exterior member 30 is formed so as to enclose the outer circumferential surfaces of the plurality of electrical wires 20 over their entire circumferences, for example. The exterior member 30 protects the electrical wires 20 from flying objects and water drops, for example. A pipe that is made of metal or resin, a protector that is made of resin, a corrugated tube that is made of resin or the like and is flexible, a waterproof cover that is made of rubber, or a combination thereof may be used as the exterior member 30, for example.

The metal pipe may be made of a metal material such as a copper-based material or an aluminum-based material, for example.

As shown in FIG. 2, the exterior member 30 includes a waterproof unit 31. The waterproof unit 31 includes a corrugated tube 40, a waterproof member 50 (waterproof tube), a waterproof member 90 (waterproof tube), and a corrugated tube 100, for example. The corrugated tubes 40 and 100 are made of a synthetic resin, for example. The corrugated tubes 40 and 100 may be made of an electrically conductive resin material or a non-electrically conductive resin material, for example. The resin material may be a synthetic resin such as polyolefin, polyamide, polyester, or an ABS resin, for example. The waterproof members 50 and 90 may be made of an elastic material that has a relatively high hardness, for example. For example, a rubber such as EPDM (Ethylene Propylene Diene Rubber) or an elastomer can be used as the elastic material.

Configuration of Corrugated Tube 40

The corrugated tube 40 is coupled to the waterproof member 50. The corrugated tube 40 has a tubular shape overall and collectively encloses the outer circumferential surfaces of the plurality of electrical wires 20, for example. The corrugated tube 40 encloses the outer circumferential surfaces of the plurality of electrical wires 20 over their entire circumferences, for example. The corrugated tube 40 has a bellows structure in which ring-shaped protrusions 41 and ring-shaped recesses 42 are provided continuously and alternately in the axial direction of the corrugated tube 40. The corrugated tube 40 is more flexible than the core wires 21. The corrugated tube 40 according to the present embodiment is formed so as to have a cylindrical shape.

Configuration of Corrugated Tube 100

The corrugated tube 100 is disposed between the waterproof member 50 and the waterproof member 90 and is coupled to the waterproof member 50 and the waterproof member 90. The corrugated tube 100 is formed separately from the corrugated tube 40, for example. The corrugated tube 100 has a tubular shape overall and collectively encloses the outer circumferential surfaces of the plurality of electrical wires 20, for example. The corrugated tube 100 encloses the outer circumferential surfaces of the plurality of electrical wires 20 over their entire circumferences, for example. The corrugated tube 100 has a bellows structure in which ring-shaped protrusions 101 and ring-shaped recesses 102 are provided continuously and alternately in the axial direction of the corrugated tube 100. The corrugated tube 100 is more flexible than the core wires 21. The corrugated tube 100 is formed so as to have higher flexural rigidity than the waterproof member 50. The corrugated tube 100 according to the present embodiment is formed so as to have a cylindrical shape.

Configuration of Waterproof Member 50

The waterproof member 50 has a tubular shape overall and collectively encloses the outer circumferential surfaces of the plurality of electrical wires 20, for example. The waterproof member 50 is attached to a through hole 200X that is formed in a vehicle body panel 200, for example. Here, the vehicle body panel 200 is located between a waterproof area (e.g., a space outside the cabin) that requires waterproofing and a non-waterproof area (e.g., a space inside the cabin) that does not require waterproofing, for example. The vehicle body panel 200 according to the present embodiment is provided so as to separate the space outside the cabin, which is a waterproof area, and the space inside the cabin, which is a non-waterproof area, from each other. The through hole 200X is formed so as to extend through the vehicle body panel 200 in the thickness direction thereof and so that the plurality of electrical wires 20 can be passed through the through hole 200X.

The waterproof member 50 has a waterproof function of preventing, at the through hole 200X, water from entering from the space outside the cabin, which is a waterproof area, to the space inside the cabin, which is a non-waterproof area, and a function of fixing the plurality of electrical wires 20 at the through hole 200X. The waterproof member 50 is interposed between the through hole 200X and the electrical wires 20.

Figure 3:
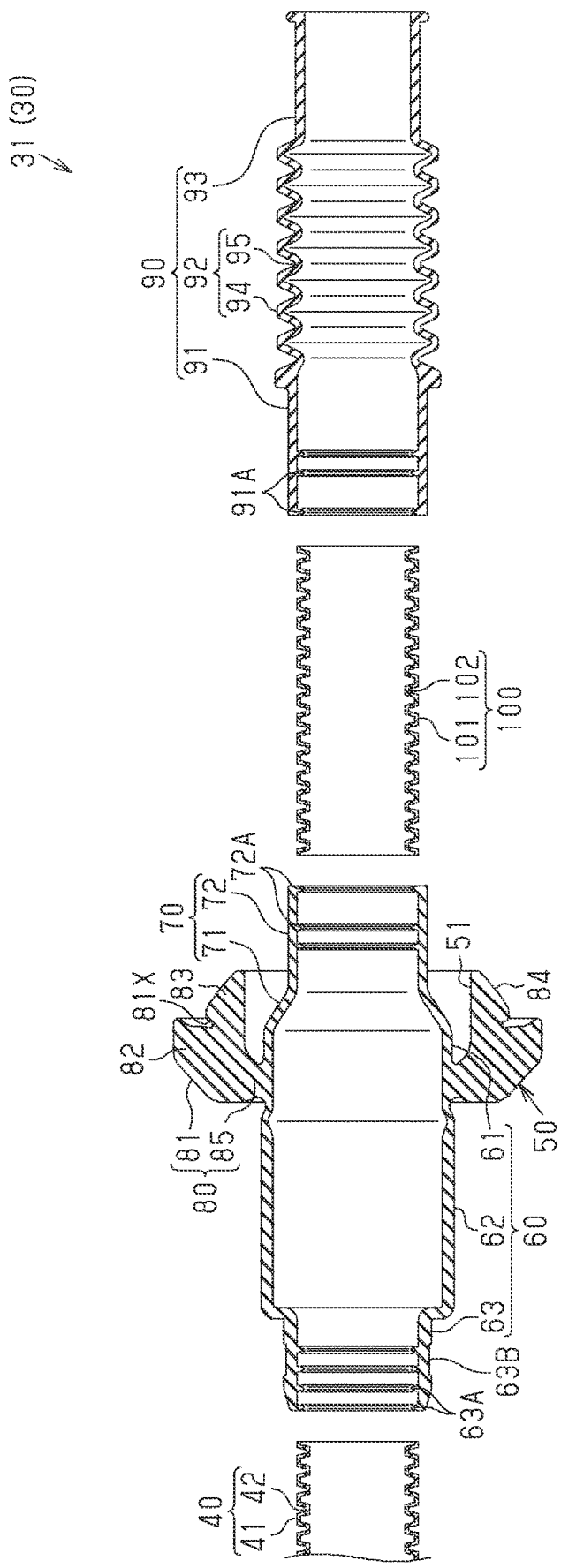
FIG. 3 is a schematic exploded cross-sectional view showing a waterproof unit according to an embodiment.

As shown in FIG. 3, the waterproof member 50 includes tube portions 60 and 70 and an attachment portion 80, for example. The attachment portion 80 is formed so as to bulge further outward in a radial direction than the outer circumferential surfaces of the other portions, namely the tube portions 60 and 70. For example, the attachment portion 80 is formed so as to protrude further outward in a radial direction than the tube portions 60 and 70 from the entire circumferences of the tube portions 60 and 70, for example. That is to say, the outer diameter of the attachment portion 80 is greater than the outer diameters of the tube portions 60 and 70. The waterproof member 50 is, for example, a single component obtained by forming the tube portions 60 and 70 and the attachment portion 80 continuously into one piece. The waterproof member 50 according to the present embodiment is formed so as to have a cylindrical shape overall.

As shown in FIG. 2, in a state where the waterproof member 50 is attached to the through hole 200X of the vehicle body panel 200, the attachment portion 80 is fitted to the through hole 200X, the tube portion 60 is located outside the cabin, and the tube portion 70 is located inside the cabin. In other words, out of the tube portions 60 and 70, a portion disposed outside the cabin is the tube portion 60, and a portion disposed inside the cabin is the tube portion 70.

An end portion of the waterproof member 50 in its axial direction in which the center axis of the waterproof member 50 extends, namely an end portion of the tube portion 60 in the axial direction, is fitted to an end portion of the corrugated tube 40, for example. The end portion of the tube portion 60 is fitted to the outer surface of the end portion of the corrugated tube 40, for example. Out of the end portions of the waterproof member 50 in its axial direction, an end portion opposite to the tube portion 60, namely an end portion of the tube portion 70 in the axial direction, is fitted to an end portion of the corrugated tube 100, for example. The end portion of the tube portion 70 is fitted to the outer surface of the end portion of the corrugated tube 100, for example. In the state where the end portion of the tube portion 60 is fitted to the end portion of the corrugated tube 40 and the end portion of the tube portion 70 is fitted to the end portion of the corrugated tube 100, the internal space of the corrugated tube 40, the internal space of the waterproof member 50, and the internal space of the corrugated tube 100 are in communication with each other, thus forming a passage through which the plurality of electrical wires 20 can be passed.

Configuration of Attachment Portion 80

The attachment portion 80 includes an attachment body portion 81 that is attached to the through hole 200X and a coupling portion 85 that couples the attachment body portion 81 and the tube portions 60 and 70, for example.

The attachment body portion 81 is configured so as to elastically abut against the vehicle body panel 200 in close contact therewith in the state where the waterproof member 50 is attached to the through hole 200X. The attachment body portion 81 has a ring-like plate shape that matches the through hole 200X overall, for example. The size of the attachment body portion 81 in a radial direction thereof (i.e., thickness) is greater than the thickness of each of the tube portions 60 and 70, for example.

The attachment body portion 81 includes an outer flange 82 that is provided on the tube portion 60 side and an inner flange 83 that is provided on the tube portion 70 side. In the state where the waterproof member 50 is attached to the through hole 200X, the outer flange 82 is located outside the cabin, and the inner flange 83 is located inside the cabin.

The outer flange 82 has a greater outer diameter than that of the inner flange 83, for example. The outer flange 82 has a greater thickness than that of the inner flange 83, for example.

An inclined surface 84 inclined such that the outer diameter of the inner flange 83 decreases in a direction away from the outer flange 82 is formed on the outer circumferential surface of the inner flange 83. The inclined surface 84 makes it easier to fit the attachment body portion 81 into the through hole 200X.

A groove portion 81X into which a portion of the vehicle body panel 200 that constitutes a peripheral edge portion of the through hole 200X is fitted is provided between the outer flange 82 and the inner flange 83. In a state where the vehicle body panel 200 is fitted into the groove portion 81X, the outer flange 82 is in close contact with the surface of the vehicle body panel 200 that faces the space outside the cabin, and the inner flange 83 is in close contact with the surface of the vehicle body panel 200 that faces the space inside the cabin. Thus, the vehicle body panel 200 is elastically held between the outer flange 82 and the inner flange 83. Therefore, when the vehicle body panel 200 is fitted into the groove portion 81X, movement of the waterproof member 50 in the axial direction thereof is restricted.

The coupling portion 85 is formed so as to connect an inner circumferential portion of the attachment body portion 81 and an outer circumferential portion of the tube portion 60, for example. The coupling portion 85 is formed so as to have a ring shape, for example. The coupling portion 85 is formed continuously over the entire circumference of the tube portion 60, for example. The coupling portion 85 is formed so as to couple an inner circumferential portion of the outer flange 82 and an outer circumferential portion of an intermediate portion of the tube portion 60 in the axial direction thereof, for example. The coupling portion 85 is formed only in a portion of the inner circumferential surface of the attachment body portion 81, for example. In other words, the coupling portion 85 is not formed in a portion of the inner circumferential surface of the outer flange 82 and the inner circumferential surface of the inner flange 83, for example. Accordingly, a recessed portion 51 is formed between the inner flange 83 and the tube portions 60 and 70. The recessed portion 51 is formed continuously over the entire circumference of the tube portion 70, for example. The recessed portion 51 is formed so as to extend from an end portion of the inner flange 83 to the coupling portion 85 in the axial direction of the waterproof member 50, for example. Due to the recessed portion 51, the inner circumferential surface of the inner flange 83 and the outer circumferential surface of the tube portion 70 are spaced apart from each other, and a portion of the inner circumferential surface of the outer flange 82 and the outer circumferential surface of an end portion of the tube portion 60 are spaced apart from each other.

Configuration of Tube Portion 60

The tube portion 60 includes a coupling portion 61 that is coupled to the tube portion 70, an intermediate portion 62 that is continuous with the coupling portion 61, and a connection portion 63 that is continuous with the intermediate portion 62 and is connected to an end portion of the corrugated tube 40. The tube portion 60 is formed coaxially with the attachment portion 80, for example.

Configurations of Coupling Portion 61 and Intermediate Portion 62

The coupling portion 61 and the intermediate portion 62 are formed so as to have a tubular shape with a size that allows the coupling portion 61 and the intermediate portion 62 to collectively enclose the plurality of electrical wires 20. The coupling portion 61 and the intermediate portion 62 according to the present embodiment are formed so as to have a cylindrical shape in which both the outer circumferential surface and the inner circumferential surface are substantially even. The inner circumferential surfaces of the coupling portion 61 and the intermediate portion 62 are formed so as to extend in parallel with the axial direction of the waterproof member 50, for example. Internal spaces of the coupling portion 61 and the intermediate portion 62 are formed so as to have an approximately constant aperture diameter over the entire lengths of the coupling portion 61 and the intermediate portion 62 in the axial direction thereof, for example. That is to say, the coupling portion 61 and the intermediate portion 62 are formed so as to have an approximately constant inner diameter over the entire lengths of the coupling portion 61 and the intermediate portion 62 in the axial direction thereof.

An end portion of the coupling portion 61 in its axial direction is coupled to and integrated with an end portion of the tube portion 70, and the other end portion of the coupling portion 61 in its axial direction is coupled to and integrated with an end portion of the intermediate portion 62, for example. An end portion of the intermediate portion 62 in its axial direction is coupled to and integrated with an end portion of the connection portion 63, for example. The coupling portion 85 of the attachment portion 80 is coupled to a part of the outer circumferential surface of the intermediate portion 62 in the vicinity of the coupling portion 61. Most part of the intermediate portion 62 is formed so as to protrude from an end portion of the attachment portion 80 toward the corrugated tube 40.

Configuration of Connection Portion 63

The connection portion 63 is formed so as to have a tubular shape with a size that allows the connection portion 63 to be fitted to the outer circumferential surface of the corrugated tube 40. The connection portion 63 according to the present embodiment is formed so as to have a cylindrical shape. The internal space of the connection portion 63 has a smaller aperture diameter than the internal space of the intermediate portion 62, for example. The connection portion 63 is formed so as to have an approximately constant inner diameter over the entire length of the connection portion 63 in the axial direction thereof, for example.

The inner circumferential surface of the connection portion 63 is provided with one or a plurality of (four in this example) lips 63A that lock to the corrugated tube 40, for example. The lips 63A are formed continuously over the entire circumference of the inner circumferential surface of the connection portion 63 so as to have an endless structure in which a start point and an end point coincide with each other, for example. The lips 63A are formed so as to enter the ring-shaped recesses 42 of the corrugated tube 40 when the connection portion 63 is fitted to the outer circumferential surface of the corrugated tube 40, for example.

A fixing portion 63B is formed so as to have a groove shape in the outer circumferential surface of the connection portion 63. The fixing portion 63B is formed continuously over the entire circumference of the outer circumferential surface of the connection portion 63, for example. The fixing portion 63B is provided with a coupling member 66. For example, a cable tie, a swaging ring, or the like that is made of resin or metal may be used as the coupling member 66. The connection portion 63 is fixed to the corrugated tube 40 by being fastened with the coupling member 66 from the outer circumferential surface side thereof. For example, the connection portion 63 is fastened with the coupling member 66 from the outer circumferential surface side so that the connection portion 63 comes into close contact with the corrugated tube 40 in a liquid-tight state. With this configuration, it is possible to prevent intrusion of water from a gap between the connection portion 63 and the corrugated tube 40 into the waterproof member 50.

Note that the corrugated tube 40 according to the present embodiment is only inserted into the connection portion 63 of the tube portion 60 in the waterproof member 50. In other words, the corrugated tube 40 according to the present embodiment is not inserted into the intermediate portion 62 and the coupling portion 61 of the waterproof member 50. The corrugated tube 40 is located only outside the cabin.

Configuration of Tube Portion 70

As shown in FIG. 3, the tube portion 70 is coupled to an end portion of the tube portion 60, for example. The tube portion 70 includes a coupling portion 71 that is coupled to the coupling portion 61 of the tube portion 60 and a connection portion 72 that is continuous with the coupling portion 71 and is connected to an end portion of the corrugated tube 100, for example. The tube portion 70 is formed coaxially with the tube portion 60 and the attachment portion 80, for example. The tube portion 70 is formed so as to have a smaller length in the axial direction (lengthwise direction) of the waterproof member 50 than the tube portion 60, for example. The tube portion 70 is formed so as to have a smaller length in the axial direction than the intermediate portion 62, for example.

Configuration of Coupling Portion 71

As shown in FIG. 2, an end portion of the coupling portion 71 in its axial direction is coupled to and integrated with the coupling portion 61, and the other end of the coupling portion 71 in its axial direction is coupled to and integrated with the connection portion 72, for example. The coupling portion 71 is formed so as to have a tubular shape with a size that allows the coupling portion 71 to collectively enclose the plurality of electrical wires 20. The coupling portion 71 according to the present embodiment is formed so as to have a cylindrical shape in which both the outer circumferential surface and the inner circumferential surface are substantially even. The coupling portion 71 is formed such that the outer diameter and the inner diameter thereof decrease in the direction from the tube portion 60 side toward the connection portion 72 side, for example.

Configuration of Connection Portion 72

The connection portion 72 is formed so as to have a tubular shape with a size that allows the connection portion 72 to be fitted to the outer circumferential surface of the corrugated tube 100. The connection portion 72 according to the present embodiment is formed so as to have a cylindrical shape. The connection portion 72 is formed so as to have an approximately constant inner diameter over the entire length of the connection portion 72 in the axial direction thereof, for example.

The inner circumferential surface of the connection portion 72 is provided with one or a plurality of (three in this example) lips 72A that lock to the corrugated tube 100, for example. The lips 72A are formed continuously over the entire circumference of the inner circumferential surface of the connection portion 72 so as to have an endless structure, for example. The lips 72A are formed so as to enter the ring-shaped recesses 102 of the corrugated tube 100 when the connection portion 72 is fitted to the outer circumferential surface of the corrugated tube 100, for example.

Configuration of Waterproof Member 90

The waterproof member 90 is formed separately from the waterproof member 50. The waterproof member 90 is spaced apart from the waterproof member 50 in the axial direction of the waterproof unit 31. The waterproof member 90 is provided inside the cabin. The waterproof member 90 has a tubular shape overall and collectively encloses the outer circumferential surfaces of the plurality of electrical wires 20, for example. The waterproof member 90 according to the present embodiment is formed so as to have a cylindrical shape overall.

The waterproof member 90 includes a connection portion 91 that is connected to an end portion of the corrugated tube 100, a bellows portion 92 that is continuous with the connection portion 91, and a straight tube portion 93 that is continuous with the bellows portion 92, for example.

An end portion of the waterproof member 90 in its axial direction along which the center axis of the waterproof member 90 extends, namely an end portion of the connection portion 91 in the axial direction is fitted to the end portion of the corrugated tube 100, for example. The end portion of the connection portion 91 is fitted to the outer surface of the end portion of the corrugated tube 100, for example. In the state where the end portion of the connection portion 91 is fitted to the end portion of the corrugated tube 100, the internal space of the corrugated tube 100 and the internal space of the waterproof member 90 are in communication with each other, thus forming a passage through which the plurality of electrical wires 20 can be passed.

Configuration of Connection Portion 91

The connection portion 91 is formed so as to have a tubular shape with a size that allows the connection portion 91 to be fitted to the outer circumferential surface of the corrugated tube 100. The connection portion 91 according to the present embodiment is formed so as to have a cylindrical shape. The connection portion 91 is formed so as to have an approximately constant inner diameter over the entire length of the connection portion 91 in the axial direction thereof, for example.

The inner circumferential surface of the connection portion 91 is provided with one or a plurality of (three in this example) lips 91A that lock to the corrugated tube 100, for example. The lips 91A are formed continuously over the entire circumference of the inner circumferential surface of the connection portion 91 so as to have an endless structure, for example. The lips 91A are formed so as to enter the ring-shaped recesses 102 of the corrugated tube 100 when the connection portion 91 is fitted to the outer circumferential surface of the corrugated tube 100, for example.

Configuration of Bellows Portion 92

The bellows portion 92 is formed so as to have a tubular shape with a size that allows the bellows portion 92 to collectively enclose the plurality of electrical wires 20. The bellows portion 92 according to the present embodiment is formed so as to have a cylindrical shape. The bellows portion 92 has a bellows structure in which ring-shaped protrusions 94 and ring-shaped recesses 95 are provided continuously and alternately in the axial direction of the bellows portion 92. The bellows portion 92 is more flexible than the connection portion 91 and the straight tube portion 93, for example. An end portion of the bellows portion 92 in its axial direction is coupled to and integrated with the connection portion 91, and the other end portion of the bellows portion 92 in its axial direction is coupled to and integrated with the straight tube portion 93, for example.

The curvature radius of top portions of the ring-shaped protrusions 94 is smaller than the curvature radiuses of top portions of the ring-shaped protrusions 41 and 101 of the corrugated tubes 40 and 100, for example. The curvature radius of bottom portions of the ring-shaped recesses 95 is smaller than the curvature radiuses of bottom portions of the ring-shaped recesses 42 and 102 of the corrugated tubes 40 and 100, for example.

Configuration of Straight Tube Portion 93

The straight tube portion 93 is formed so as to have a tubular shape with a size that allows the straight tube portion 93 to collectively enclose the plurality of electrical wires 20. The straight tube portion 93 according to the present embodiment is formed so as to have a cylindrical shape in which both the outer circumferential surface and the inner circumferential surface are substantially even. The inner circumferential surface of the straight tube portion 93 is formed so as to extend in parallel with the axial direction of the waterproof member 90, for example. The straight tube portion 93 is formed so as to have an approximately constant inner diameter over the entire length of the straight tube portion 93 in the axial direction thereof, for example.

Configuration of Corrugated Tube 100

The corrugated tube 100 is disposed between the waterproof member 50 and the waterproof member 90, for example. The ring-shaped protrusions 101 and the ring-shaped recesses 102 are formed over the entire length of the corrugated tube 100 in the axial direction thereof, for example. An end portion of the corrugated tube 100 in its axial direction is fitted to the inner surface of the connection portion 72 of the waterproof member 50, and the other end portion of the corrugated tube 100 in its axial direction is fitted to the inner surface of the connection portion 91 of the waterproof member 90, for example. The corrugated tube 100 is only fitted to the tube portion 70 in the waterproof member 50, for example. The corrugated tube 100 is located only inside the cabin, which is a non-waterproof area, for example. The corrugated tube 100 is only fitted to the connection portion 91 in the waterproof member 90, for example.

The end portion of the corrugated tube 100 in its axial direction is coupled to the connection portion 72 with use of a coupling member 110, and the other end portion of the corrugated tube 100 in its axial direction is coupled to the connection portion 91 with use of a coupling member 120. The corrugated tube 100 couples the waterproof member 50 and the waterproof member 90 to each other.

Configuration of Coupling Members 110 and 120

For example, cable ties or swaging rings that are made of resin or metal, tape members, or the like may be used as the coupling members 110 and 120. The coupling members 110 and 120 according to the present embodiment are tape members that include sticky layers on one side thereof.

Configuration of Coupling Member 110

The coupling member 110 is formed so as to fix the connection portion 72 of the waterproof member 50 to the outer circumferential surface of the corrugated tube 100, for example. The coupling member 110 is wound around the connection portion 72 and the corrugated tube 100 with the sticky layer facing radially inward, for example. The coupling member 110 is wound around a region spanning from the outer circumferential surface of an end portion in the axial direction of the connection portion 72 to the outer circumferential surface of the corrugated tube 100 exposed from the waterproof member 50, for example. The coupling member 110 is continuously wound around the region from the outer circumferential surface of the connection portion 72 to the outer circumferential surface of the corrugated tube 100, for example. The coupling member 110 has an overlapped winding structure, for example. Here, the overlapped winding structure is a structure formed by winding the coupling member 110 (tape member) in a spiral shape such that predetermined portions in the width direction of the coupling member 110 overlap each other. Note that the width direction of the coupling member 110 refers to a direction extending along the axial direction of the waterproof member 50. The overlapped winding structure is preferably a half-lap winding structure, for example. Here, the half-lap winding structure is a structure formed by winding the coupling member 110 (tape member) in a spiral shape such that substantially half portions in the width direction of the coupling member 110 overlap each other.

The coupling member 110 covers the connection portion 72 from the outer circumferential surface side thereof so as to fasten the connection portion 72 to the corrugated tube 100, for example. The coupling member 110 covers the outer circumferential surface of the connection portion 72 over its entire circumference, for example. The connection portion 72 of the waterproof member 50 is fixed to the corrugated tube 100 by being fastened radially inward using the coupling member 110, for example.

Configuration of Coupling Member 120

The coupling member 120 is formed so as to fix the connection portion 91 of the waterproof member 90 to the outer circumferential surface of the corrugated tube 100, for example. The coupling member 120 is wound around the connection portion 91 and the corrugated tube 100 with the sticky layer facing radially inward, for example. The coupling member 120 is wound around a region spanning from the outer circumferential surface of the end portion in the axial direction of the connection portion 91 to the outer circumferential surface of the corrugated tube 100 exposed from the waterproof member 90, for example. The coupling member 120 is continuously wound around the region from the outer circumferential surface of the connection portion 91 to the outer circumferential surface of the corrugated tube 100, for example. The coupling member 120 has an overlapped winding structure, for example.

The coupling member 120 covers the connection portion 91 from the outer circumferential surface side thereof so as to fasten the connection portion 91 to the corrugated tube 100, for example. The coupling member 120 covers the outer circumferential surface of the connection portion 91 over its entire circumference, for example. The connection portion 91 of the waterproof member 90 is fixed to the corrugated tube 100 by being fastened radially inward with the coupling member 120, for example.

The following describes functions and effects of the present embodiment.

(1) The waterproof unit 31 includes the tubular waterproof member 50 that is attached to the through hole 200X of the vehicle body panel 200 provided between the space outside the cabin, which is a waterproof area, and the space inside the cabin, which is a non-waterproof area, and the tubular waterproof member 90 that is provided inside the cabin so as to be spaced apart from the waterproof member 50. The waterproof unit 31 includes the corrugated tube 100 that is disposed between the waterproof member 50 and the waterproof member 90, is coupled to the waterproof member 50 and the waterproof member 90, and has higher flexural rigidity than the waterproof member 50.

According to this configuration, the corrugated tube 100 having higher flexural rigidity than the waterproof member 50 is provided between the waterproof member 50 and the waterproof member 90. Therefore, the corrugated tube 100 can be kept from being sharply bent. For example, the corrugated tube 100 can be kept from being brought into a sharply bent state. Accordingly, the corrugated tube 100 can be kept from coming into contact with the waterproof member 50 as a result of being bent. For example, the corrugated tube 100 can be kept from coming into contact with the attachment portion 80 (specifically, the inner flange 83) of the waterproof member 50 as a result of being bent. Consequently, it is possible to suppress damage to the waterproof unit 31 due to contact between the corrugated tube 100 and the waterproof member 50, and thus degradation of the waterproof performance of the waterproof unit 31 can be suppressed.

(2) The corrugated tube 100 is only fitted to a portion of the waterproof member 50 located inside the cabin, namely the tube portion 70 of the waterproof member 50, and the tube portion 70 and the corrugated tube 100 are coupled to each other using the coupling member 110. According to this configuration, the waterproof member 50 and the corrugated tube 100 are coupled to each other inside the cabin, which is a non-waterproof area. Here, high waterproof performance is not required in the non-waterproof area when compared with a waterproof area. Therefore, when compared with a case where the waterproof member 50 and the corrugated tube 100 are coupled to each other in a waterproof area, it is possible to increase the freedom in choosing the material of the coupling member 110 or the like.

(3) The coupling member 110 is constituted by a tape member that covers the outer circumferential surface of the tube portion 70 and the outer circumferential surface of the corrugated tube 100. According to this configuration, the tube portion 70 and the corrugated tube 100 can be coupled to each other using the tape member. Therefore, it is possible to easily couple the tube portion 70 and the corrugated tube 100. Also, since the tape member is disposed inside the cabin, the tape member can be kept from coming into contact with a liquid such as rain water. Therefore, it is possible to favorably suppress degradation of the adhesiveness of the tape member due to contact with a liquid, and thus the tube portion 70 and the corrugated tube 100 can be favorably kept coupled to each other by the coupling member 110, which is the tape member.

(4) The inner circumferential surface of the tube portion 70 is provided with the lips 72A that fit in the ring-shaped recesses 102 of the corrugated tube 100. According to this configuration, the lips 72A are formed on the inner circumferential surface of the tube portion 70 and are fitted to the ring-shaped recesses 102 of the corrugated tube 100. Accordingly, the lips 72A of the tube portion 70 can be locked to the ring-shaped protrusions 101 of the corrugated tube 100, and thus the corrugated tube 100 can be kept from moving in the axial direction of the tube portion 70. Consequently, it is possible to suppress displacement of the corrugated tube 100 in the axial direction of the tube portion 70.

(5) Moreover, the lips 72A are provided between the inner circumferential surface of the tube portion 70 and the outer circumferential surface of the corrugated tube 100. With this configuration, it is possible to improve the waterproof performance between the inner circumferential surface of the tube portion 70 and the outer circumferential surface of the corrugated tube 100. Consequently, it is possible to improve the waterproof performance at the portion where the tube portion 70 and the corrugated tube 100 are coupled to each other.

(6) The inner circumferential surface of the connection portion 91 of the waterproof member 90 is provided with the lips 91A that fit in the ring-shaped recesses 102 of the corrugated tube 100. According to this configuration, the lips 91A are formed on the inner circumferential surface of the connection portion 91 and are fitted to the ring-shaped recesses 102 of the corrugated tube 100. Accordingly, the lips 91A of the connection portion 91 can be locked to the ring-shaped protrusions 101 of the corrugated tube 100, and thus the corrugated tube 100 can be kept from moving in the axial direction of the waterproof member 90. Consequently, it is possible to suppress displacement of the corrugated tube 100 in the axial direction of the waterproof member 90.

(7) Moreover, the lips 91A are provided between the inner circumferential surface of the connection portion 91 and the outer circumferential surface of the corrugated tube 100. With this configuration, it is possible to improve the waterproof performance between the inner circumferential surface of the connection portion 91 and the outer circumferential surface of the corrugated tube 100. Consequently, it is possible to improve the waterproof performance at the portion where the connection portion 91 and the corrugated tube 100 are coupled to each other.

(8) The corrugated tube 40 separate from the corrugated tube 100 is coupled to the tube portion 60 of the waterproof member 50. According to this configuration, the corrugated tube 100 and the corrugated tube 40 are individually coupled to the waterproof member 50. Accordingly, the lengths by which the corrugated tubes 40 and 100 are inserted into the waterproof member 50 can be reduced when compared with a case where the corrugated tubes 40 and 100 are formed as a single piece. Therefore, it is possible to facilitate insertion of the corrugated tube 40 into the waterproof member 50 and insertion of the corrugated tube 100 into the waterproof member 50.

OTHER EMBODIMENTS

The above-described embodiment may be modified in the following manner and carried out. The above-described embodiment and the following modifications may be combined with each other and carried out as long as technical inconsistencies do not arise.

Figure 4:
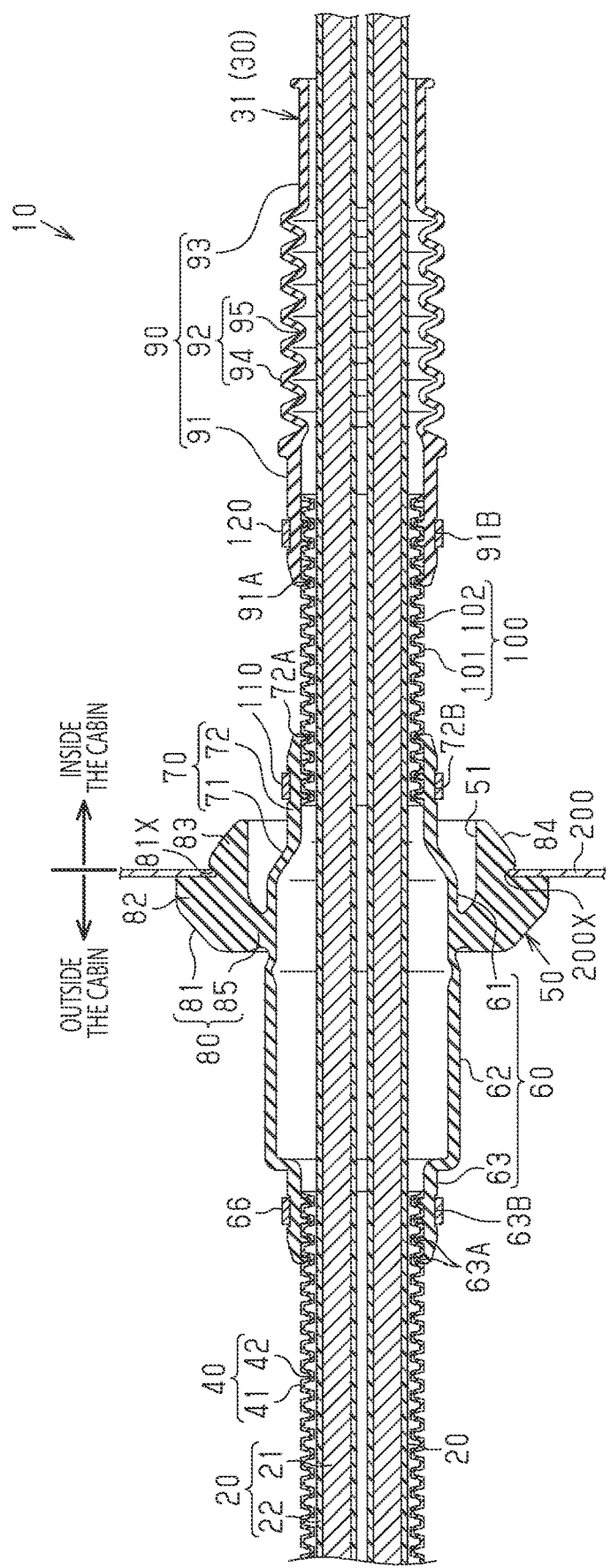
FIG. 4 is a schematic cross-sectional view showing a wire harness according to a variation.

As shown in FIG. 4, the outer circumferential surface of the connection portion 72 of the tube portion 70 may be provided with a fixing portion 72B that is formed so as to have a groove shape, for example. The fixing portion 72B is formed continuously over the entire circumference of the outer circumferential surface of the connection portion 72, for example. The fixing portion 72B may be provided with a coupling member 110. In this case, a cable tie, a swaging ring, or the like that is made of resin or metal may be used as the coupling member 110, for example. The connection portion 72 is fixed to the corrugated tube 100 by being fastened with the coupling member 110 from the outer circumferential surface side thereof, for example.

As shown in FIG. 4, the outer circumferential surface of the connection portion 91 of the waterproof member 90 may be provided with a fixing portion 91B that is formed so as to have a groove shape, for example. The fixing portion 91B is formed continuously over the entire circumference of the outer circumferential surface of the connection portion 91, for example. The fixing portion 91B may be provided with a coupling member 120. In this case, a cable tie, a swaging ring, or the like that is made of resin or metal may be used as the coupling member 120, for example. The connection portion 91 is fixed to the corrugated tube 100 by being fastened with the coupling member 120 from the outer circumferential surface side thereof, for example.

In the above-described embodiment, the corrugated tube 100 is fitted to the inner surface of the tube portion 70, but there is no limitation to this configuration. For example, the corrugated tube 100 may be fitted to the outer surface of the tube portion 70.

In the above-described embodiment, the length by which the corrugated tube 100 is inserted into the waterproof member 50 can be changed as appropriate. For example, the corrugated tube 100 may be inserted into the coupling portion 71 of the tube portion 70. Alternatively, the corrugated tube 100 may be inserted into the tube portion 60 disposed outside the cabin.

In the above-described embodiment, the corrugated tube 100 is fitted to the inner surface of the connection portion 91, but there is no limitation to this configuration. For example, the corrugated tube 100 may be fitted to the outer surface of the connection portion 91.

In the above-described embodiment, the length by which the corrugated tube 100 is inserted into the waterproof member 90 can be changed as appropriate. For example, the corrugated tube 100 may be inserted into the bellows portion 92 of the waterproof member 90.

In the above-described embodiment, the corrugated tube 40 is fitted to the inner surface of the tube portion 60, but there is no limitation to this configuration. For example, the corrugated tube 40 may be fitted to the outer surface of the tube portion 60.

In the above-described embodiment, the length by which the corrugated tube 40 is inserted into the waterproof member 50 can be changed as appropriate. For example, the corrugated tube 40 may be inserted into the intermediate portion 62 of the tube portion 60. Alternatively, the corrugated tube 40 may be inserted into the tube portion 70 disposed inside the cabin.

In the above-described embodiment, the corrugated tube 100 has a structure in which the ring-shaped protrusions 101 and the ring-shaped recesses 102 are formed over the entire length of the corrugated tube 100 in the axial direction thereof, but there is no limitation to this configuration. For example, the corrugated tube 100 may be formed so as to have a structure in which the ring-shaped protrusions 101 and the ring-shaped recesses 102 are formed only in a portion of the corrugated tube 100 in the axial direction thereof. For example, a configuration is also possible in which the ring-shaped protrusions 101 and the ring-shaped recesses 102 are formed only in portions of the corrugated tube 100 that are fitted to the waterproof members 50 and 90.

In the above-described embodiment, a first exterior member (first exterior tube) is embodied as the corrugated tube 100, but there is no limitation to this configuration. The first exterior member is not particularly limited as long as the first exterior member can house the electrical wires 20 and has higher flexural rigidity than the waterproof member 50. For example, the first exterior member may be embodied as a hard resin pipe.

In the above-described embodiment, a second exterior member (second exterior tube) is embodied as the corrugated tube 40, but there is no limitation to this configuration. The second exterior member is not particularly limited as long as the second exterior member can house the electrical wires 20. For example, a hard resin pipe, a metal pipe, or a rubber waterproof cover can be used as the second exterior member.

Figure 5:
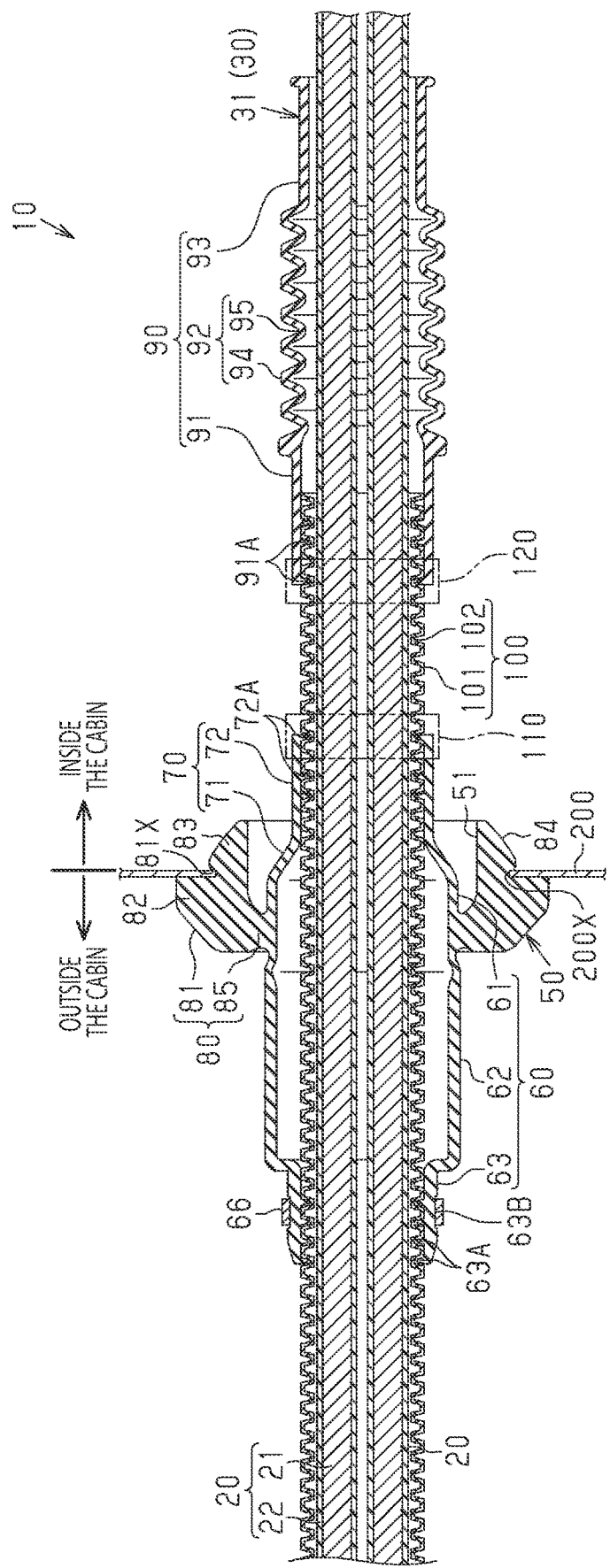
FIG. 5 is a schematic cross-sectional view showing a wire harness according to a variation.

As shown in FIG. 5, the corrugated tube 100 may be provided so as to extend through the waterproof member 50. In this case, the corrugated tube 100 is formed so as to extend from the space inside the cabin, which is a non-waterproof area, to the space outside the cabin, which is a waterproof area, via the internal space of the waterproof member 50. The corrugated tube 100 is drawn out from both end portions of the waterproof member 50. That is to say, the corrugated tube 100 is formed so as to extend from the waterproof member 50 toward the waterproof member 90 inside the cabin and extend from the waterproof member 50 in a direction away from the waterproof member 50 outside the cabin. In this variation, the corrugated tube 40 shown in FIG. 2 is omitted.

According to this configuration, the exterior member extending from the waterproof member 50 inside the cabin and the exterior member extending from the waterproof member 50 outside the cabin can be constituted by the single corrugated tube 100. Therefore, the number of components can be reduced when compared with a case where separate exterior members extend from the two end portions of the waterproof member 50.

The structure of the waterproof member 50 in the above-described embodiment is not particularly limited. For example, as long as the waterproof member 50 includes a structure that allows the waterproof member 50 to be attached to the through hole 200X of the vehicle body panel 200 and a structure that allows the waterproof member 50 to be coupled to the corrugated tube 100, the other structures are not particularly limited. For example, the tube portion 70 of the waterproof member 50 may be omitted in the variation shown in FIG. 5. In this case, the waterproof member 50 and the corrugated tube 100 are coupled to each other using the coupling member 66 provided on the outer circumferential surface of the tube portion 60, for example.

The structure of the waterproof member 90 in the above-described embodiment is not particularly limited. For example, as long as the waterproof member 90 includes a structure that allows the waterproof member 90 to be coupled to the corrugated tube 100, the other structures are not particularly limited. For example, the waterproof member 90 may be formed so as to have the bellows structure over the entire length of the waterproof member 90 in the axial direction thereof. For example, the bellows portion 92 of the waterproof member 90 may be omitted.

It is also possible to adopt a configuration in which an electromagnetic shielding member is provided inside the exterior member 30, although this is not specifically mentioned in the above-described embodiment. The electromagnetic shielding member is provided so as to collectively enclose the plurality of electrical wires 20, for example. The electromagnetic shielding member is disposed between the inner circumferential surface of the exterior member 30 and the outer circumferential surfaces of the electrical wires 20, for example. For example, a flexible braided wire or metal foil may be used as the electromagnetic shielding member. The braided wire may be a braided wire that is obtained by braiding a plurality of metal strands or a braided wire that is obtained by braiding metal strands and resin strands in combination. A reinforced fiber with excellent insulation properties and shear resistance, such as a para-aramid fiber, can be used as the resin strands, for example.

The electrical wires 20 in the above-described embodiment may be replaced with shielded electrical wires.

The electrical wires 20 in the above-described embodiment may be replaced with low-voltage electrical wires.

In the above-described embodiment, two electrical wires 20 are housed in the exterior member 30, but there is no limitation to this configuration, and the number of electrical wires 20 can be changed according to the specifications of the vehicle V. For example, the number of electrical wires 20 housed in the exterior member 30 may be one, or three or more. For example, a configuration is also possible in which a low-voltage electrical wire that connects a low-voltage battery and various low-voltage devices (a lamp, a car audio, etc.) is added as an electrical wire housed in the exterior member 30.

The arrangement relationship between the inverter 11 and the high-voltage battery 12 in the vehicle V is not limited to that in the above-described embodiment, and may be changed as appropriate according to the configuration of the vehicle.

Figure 6:
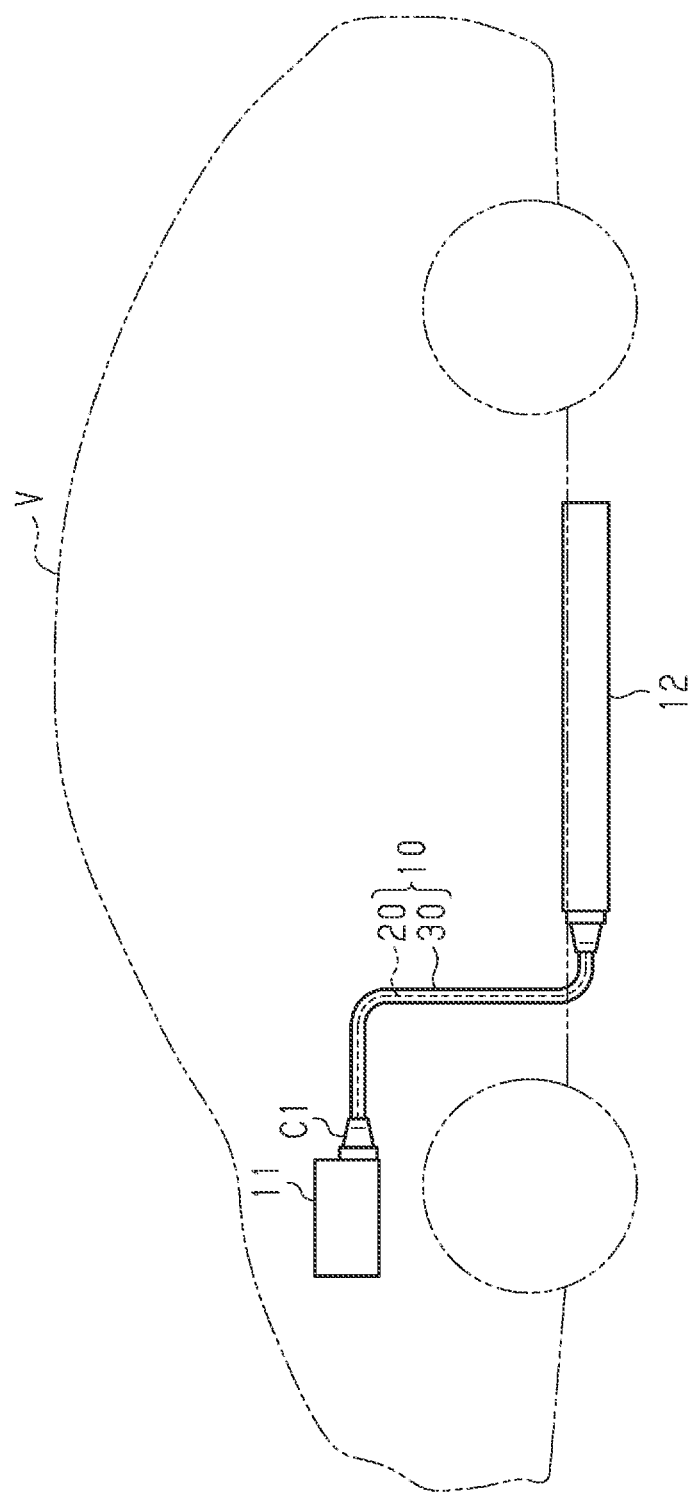
FIG. 6 is a schematic configuration diagram showing a wire harness according to a variation.

For example, as shown in FIG. 6, a configuration is also possible in which the high-voltage battery 12 is disposed across substantially the entire floor of the vehicle V and the wire harness 10 electrically connects the high-voltage battery 12 and the inverter 11.

In the above-described embodiment, the inverter 11 and the high-voltage battery 12 are adopted as electrical devices connected by the wire harness 10, but there is no limitation to this configuration. For example, the present disclosure may also be applied to an electrical wire that connects the inverter 11 and a motor for driving wheels. That is to say, the present disclosure is applicable to an object that electrically connects electrical devices installed in the vehicle V.

In each embodiment, the entire length, the maximum diameter, and the wall thickness of the tube portion 70 can be set so as to control or prevent buckling of the tube portion 70. For example, as shown in FIGS. 2 and 3, the tube portion 70 (the coupling portion 71 and the connection portion 72) may have a constant or substantially constant wall thickness except for the lips 72A. This configuration is advantageous in keeping the tube portion 70 at a predetermined or controlled position relative to the vehicle body panel 200 in a state where the waterproof member 50 is attached to the vehicle body panel 200 in a fixed manner. For example, this configuration is advantageous in keeping the tube portion 70 at an inclined position within a predetermined or controlled angle range relative to the vehicle body panel 200.

The recessed portion 51 of the waterproof member 50 in each embodiment has a predetermined recessed depth in the thickness direction of the waterproof member 50, namely in the direction from the end portion of the waterproof member 50 inside the cabin toward the end portion of the waterproof member 50 outside the cabin. As in the example shown in FIG. 2, the depth of the recessed portion 51 may be set such that the deepest portion or the recessed end of the recessed portion 51 is closer to the end portion of the waterproof member 50 outside the cabin than to the end portion of the waterproof member 50 inside the cabin, for example, the deepest portion or the recessed end is closer to the end portion of the waterproof member 50 outside the cabin than the groove portion 81X is. This configuration is advantageous in preventing the waterproof member 50 from falling off the vehicle body panel 200, securing the entire length of the tube portion 70, and reducing the protruding length of the tube portion 70 from the end portion of the waterproof member 50 inside the cabin. As shown in FIG. 2, the depth of the recessed portion 51 may be about half the entire length of the tube portion 70, although there is no limitation thereto. The protruding length of the tube portion 70 from the end portion of the waterproof member 50 inside the cabin may be approximately the same as the depth of the recessed portion 51.

As shown in FIG. 3, the coupling portion 71 of the tube portion 70 may include a large-diameter portion that is a proximal end portion of the tube portion 70 and a tapered portion that is an intermediate portion of the tube portion 70. The connection portion 72 may include a small-diameter portion that is a distal end portion of the tube portion 70. The boundary between the coupling portion 71 (tapered portion) and the connection portion 72 (small-diameter portion) of the tube portion 70 may be located between the end portion of the waterproof member 50 inside the cabin and the recessed end of the recessed portion 51. According to this configuration, the inner flange 83 surrounds the boundary between the coupling portion 71 (tapered portion) and the connection portion 72 (small-diameter portion) of the tube portion 70, and therefore, this configuration is advantageous in preventing or suppressing excessive bending at the boundary between the coupling portion 71 (tapered portion) and the connection portion 72 (small-diameter portion) when the tube portion 70 is inclined. Note that angulation or a bend line may be formed at the boundary between the outer surface of the coupling portion 71 and the outer surface of the connection portion 72 of the tube portion 70. Alternatively, the outer surface of the coupling portion 71 and the outer surface of the connection portion 72 of the tube portion 70 may be smoothly connected to each other.

As in the example shown in FIG. 3, the tube portions 60 and 70 may be aligned along a straight line in a natural state in which no external force is applied to the waterproof member 50 and the waterproof member 50 is not deformed. When the waterproof member 50 is in the natural state, the tube portions 60 and 70 may be substantially orthogonal to the groove portion 81X and the vehicle body panel 200, although there is no limitation thereto.

The embodiments disclosed herein are examples in all aspects and should not be construed as limiting the present disclosure. The scope of the present disclosure is defined not by the above description but by the claims, and is intended to encompass all modifications within the meanings and scope that are equivalent to the claims.

The invention claimed is:

1. A waterproof unit comprising:
   a first waterproof tube that has a tubular shape and is to be attached to a through hole of a vehicle body panel disposed between a waterproof area that requires waterproofing and a non-waterproof area that does not require waterproofing;
   a second waterproof tube that has a tubular shape and is to be disposed in the non-waterproof area so as to be spaced apart from the first waterproof tube; and
   a first exterior tube that has a tubular shape, is disposed between the first waterproof tube and the second waterproof tube, and is coupled to the first waterproof tube and the second waterproof tube,
   wherein the first exterior tube has higher flexural rigidity than the first waterproof tube to be kept from coming into contact with the first waterproof tube when the waterproof unit is bent in the non-waterproof area.

2. The waterproof unit according to claim 1, further comprising
   a coupler that couples the first waterproof tube and the first exterior tube to each other, wherein:
   the first waterproof tube includes an attachment to be attached to the through hole, a first tube portion to be disposed in the non-waterproof area, and a second tube portion to be disposed in the waterproof area,
   the first exterior tube is only fitted to the first tube portion in the first waterproof tube, and
   the coupler couples the first tube portion and the first exterior tube to each other.

3. The waterproof unit according to claim 2, wherein the coupler is a tape that covers an outer circumferential surface of the first tube portion and an outer circumferential surface of the first exterior tube.

4. The waterproof unit according to claim 2, wherein:
   the first exterior tube is a corrugated tube that has a bellows structure in which ring-shaped protrusions and ring-shaped recesses are provided continuously and alternately in an axial direction of the first exterior tube,
   the first tube portion is fitted to an outer surface of the first exterior tube, and
   an inner circumferential surface of the first tube portion is provided with a lip that fits in one of the ring-shaped recesses of the first exterior tube.

5. The waterproof unit according to claim 4, wherein:
   a first end in an axial direction of the second waterproof tube is fitted to an outer surface of the first exterior tube, and
   an inner circumferential surface of the first end of the second waterproof tube is provided with a lip that fits in one of the ring-shaped recesses of the first exterior tube.

6. The waterproof unit according to claim 2, further comprising
   a second exterior tube that has a tubular shape and is provided separately from the first exterior tube, and
   wherein the second exterior tube is coupled to the second tube portion.

7. The waterproof unit according to claim 1, wherein the first exterior tube extends through the first waterproof tube.

8. The waterproof unit according to claim 1, wherein:
   the first waterproof tube includes an attachment to be attached to the through hole of the vehicle body panel, a first tube portion to be disposed in the non-waterproof area, and a second tube portion to be disposed in the waterproof area,
   the first exterior tube is disposed between the first tube portion of the first waterproof tube and the second waterproof tube, and is coupled to the first tube portion of the first waterproof tube and the second waterproof tube, and
   the first tube portion of the first waterproof tube is a non-corrugated tube portion that has a smooth outer surface.

9. The waterproof unit according to claim 1, wherein:
   the first waterproof tube includes an attachment to be attached to the through hole, and
   the attachment of the first waterproof tube includes a ring-shaped recess that is formed in a non-waterproof area side end of the attachment and has a recessed depth in a direction from the non-waterproof area side end toward a waterproof area side end of the attachment.

10. The waterproof unit according to claim 9, wherein:
    the attachment of the first waterproof tube includes a groove that fits to a hole edge of the through hole of the vehicle body panel, and
    the recessed depth of the recess is such that a deepest portion of the recess is closer to the waterproof area than the groove of the first waterproof tube.

11. A wire harness comprising:
the waterproof unit according to claim 1; and
an electrical wire passed through the waterproof unit.

* * * * *